(12) United States Patent
Lüthge et al.

(10) Patent No.: US 9,879,132 B2
(45) Date of Patent: Jan. 30, 2018

(54) RELEASE AGENT AND USE THEREOF IN THE PRODUCTION OF MOULDED POLYURETHANE ARTICLES

(71) Applicant: Evonik Degussa GmbH, Essen (DE)

(72) Inventors: Thomas Lüthge, Consrade (DE); Christian Kluth, Wittenburg OT Lehsen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/249,701

(22) Filed: Aug. 29, 2016

(65) Prior Publication Data

US 2017/0130038 A1    May 11, 2017

(30) Foreign Application Priority Data

Nov. 6, 2015   (EP) .................... 15193320

(51) Int. Cl.

| | |
|---|---|
| C08L 9/00 | (2006.01) |
| C08J 9/00 | (2006.01) |
| B29C 33/60 | (2006.01) |
| B29C 33/62 | (2006.01) |
| C08G 18/69 | (2006.01) |
| C08G 18/66 | (2006.01) |
| C08G 18/76 | (2006.01) |
| C10M 173/00 | (2006.01) |
| C10M 173/02 | (2006.01) |
| C08G 18/32 | (2006.01) |
| C08G 18/48 | (2006.01) |
| B29K 75/00 | (2006.01) |
| C08G 101/00 | (2006.01) |

(52) U.S. Cl.
CPC ............. C08L 9/00 (2013.01); B29C 33/60 (2013.01); B29C 33/62 (2013.01); C08G 18/3275 (2013.01); C08G 18/48 (2013.01); C08G 18/6688 (2013.01); C08G 18/69 (2013.01); C08G 18/7664 (2013.01); C08J 9/0042 (2013.01); C10M 173/00 (2013.01); C10M 173/02 (2013.01); B29K 2075/00 (2013.01); C08G 2101/0083 (2013.01); C08J 2375/04 (2013.01); C08J 2409/00 (2013.01); C08J 2483/04 (2013.01); C10M 2205/06 (2013.01); C10N 2240/58 (2013.01)

(58) Field of Classification Search
CPC ... B29C 33/60; B29C 33/62; C08G 18/66888; C08G 18/69; C08G 18/7664; C08G 2101/0083; C08G 2101/3275; C08G 2101/48; C10M 173/00; C10M 173/02; C10M 2101/0083; C10M 2101/3275; C10M 2101/48; C08J 2375/04; C08J 2409/00; C08J 2483/04
USPC .......................................... 524/474
See application file for complete search history.

(56) References Cited

U.S. PATENT DOCUMENTS

| | | | |
|---|---|---|---|
| 4,925,882 A | 5/1990 | Makus | |
| 5,079,270 A * | 1/1992 | Burkhart | ................. B29C 33/62  521/115 |
| 5,177,136 A | 1/1993 | Herres et al. | |
| 5,919,976 A * | 7/1999 | Lee | ........................ C07C 303/04  562/120 |
| 7,259,209 B2 * | 8/2007 | Grimm | ..................... C08J 3/124  525/191 |
| 7,811,502 B2 | 10/2010 | Althoff et al. | |
| 9,120,827 B2 | 9/2015 | Balbo et al. | |
| 2011/0009532 A1 | 1/2011 | Luethge | |

FOREIGN PATENT DOCUMENTS

| | | |
|---|---|---|
| DE | 3742370 A1 | 6/1989 |
| DE | 3837351 C1 | 11/1989 |
| DE | 4020036 A1 | 1/1992 |
| EP | 1785251 A1 | 5/2007 |
| JP | 3160980 B2 * | 4/2001 |
| JP | 2002241691 A * | 8/2002 |
| WO | 2012007242 A1 | 1/2012 |
| WO | 2016026639 A1 | 2/2016 |

OTHER PUBLICATIONS

Cray Valley Hydrocarbon Specialty Chemicals, Technical Data Sheet, Poly bd® R-45HTLO, Hydroxy Terminated Polybutadiene Resin, Copyright Mar. 2012, web page, http://www.crayvalley.com/docs/TDS/poly-bd-r-45htlo.pdf (1 page).
Domeier et al., "Urethane Elastomers: Development of TDI-Free Replacement Materials for EN-7," Copyright Sep. 2000, Sandia Report, SAND2000-8224, Unlimited Release, pp. 1-56 (57 pages).
European Search Report dated Apr. 25, 2016 in EP 15 19 3320 (10 pages).

* cited by examiner

*Primary Examiner* — Michael M Bernshteyn
(74) *Attorney, Agent, or Firm* — Philip P. McCann; Smith Moore Leatherwood LLP

(57) ABSTRACT

The invention relates to compositions comprising OH-functional polybutadiene and solvent and to the use thereof as release agents in the production of polyurethane moulded articles or as antisquawk agents in the processing of moulded polyurethane articles.

19 Claims, No Drawings

RELEASE AGENT AND USE THEREOF IN THE PRODUCTION OF MOULDED POLYURETHANE ARTICLES

This application claims the benefit of European Application No. 15193320.7 filed on Nov. 6, 2015, the disclosure of which is expressly incorporated herein by reference.

FIELD

The invention relates to compositions comprising OH-functional polybutadiene and solvent and to the use thereof as release agents in the production of polyurethane moulded articles or as antisquawk agents in the processing of moulded polyurethane articles.

BACKGROUND

It is known that the polyurethane systems used for producing moulded articles exhibit strong adhesion to the employed mould materials, typically highly thermally conductive materials such as metals. Demoulding of the moulded polyurethane articles therefore requires release agents which are applied to the mould walls which come into contact with polyurethanes and/or the polyurethane reaction mixture.

Such release agents may be for example dispersions or emulsions of waxes, soaps, oils and/or silicones in solvents such as hydrocarbons or water.

After application of the release agent to the mould the solvent evaporates and the non-volatile release-active substances form a thin release film intended to ensure that the moulded polyurethane article may be easily removed from the mould after production.

In addition to the actually required release action the release agent also assumes further functions and thus also very strongly influences the surface of the moulded polyurethane article which is intended to be fine-pored/smooth and uniform in order inter alia to ensure good coverability of the finished moulded articles with textiles or leather.

In order to reduce environmental pollution with organic material there is a great interest in aqueous-based release agents free from volatile organic material. However, compared to conventional release agents comprising organic solvents the aqueous release agents on the market often have the disadvantage that after evaporation of a large part of the water a thin water film which is not volatilized at the typical mould temperatures of 45° C. to 80° C., preferably 50° C. to 75° C., is always left behind in the mould and undergoes reactions with isocyanate compounds of the polyurethane system which result in very hard polyurea compounds. This can result in disruption of the mould surfaces due to so-called buildup which needs to be removed by costly and inconvenient cleaning.

Typical examples of aqueous release agents having a good demoulding action are described for example in DE A 37 42 370 or DE A 40 20 036. These agents comprise as the release-active substance unsaturated oligomeric or polymeric hydrocarbons having molecular weights of at least 500 and iodine numbers of at least 60, particularly preferably liquid polybutadiene having molecular weights of about 3000 and iodine numbers of about 450. EP 1785251 describes the use of polyisobutylenes in release agents.

These release agents have an oily character which has the result that the surface of the moulded polyurethane article feels oily. This is not just a haptic deficiency but also a technical one since the surfaces also have only poor adherability so that for example sensors may be bonded to the relevant surfaces of moulded polyurethane articles only with difficulty, if at all.

SUMMARY

The present invention accordingly has for its object the provision of a release agent which does not exhibit one or more of the disadvantages mentioned. The present invention in particular has for its object the provision of a release agent which when employed affords moulded polyurethane article surfaces which are adherable but nevertheless exhibit good release properties.

It has now been found that, surprisingly, this object can be achieved by employing release agents comprising OH-functional polybutadiene.

The present invention accordingly provides compositions comprising OH-functional polybutadiene and solvent.

The present invention likewise provides for the use of the compositions according to the invention as release agents in the production of moulded polyurethane articles or as anti-squawk agents in the processing of moulded polyurethane articles.

The compositions according to the invention have the advantage that when they are used as release agents or antisquawk agents in the production or processing of polyurethane articles the surfaces of the moulded polyurethane articles remain adherable.

It is a further advantage that the surfaces of the treated moulded polyurethane articles do not feel as oily as surfaces treated with nonfunctionalized polybutadiene.

It is a further advantage that the dry moulded polyurethane article surfaces do not directly or indirectly transfer oily constituents to other surfaces such as further moulded polyurethane article surfaces for example.

DETAILED DESCRIPTION

The compositions according to the invention, a process for the production thereof and the use of the composition are described hereinbelow by way of example without any intention to restrict the invention to these exemplary embodiments. When ranges, general formulae or compound classes are specified hereinbelow, these shall encompass not just the corresponding ranges or groups of compounds that are explicitly mentioned but also all subranges and subgroups of compounds obtainable by extracting individual values (ranges) or compounds. Where documents are cited in the context of the present description, their content shall fully form part of the disclosure content of the present invention, particularly in respect of the substantive matter in the context for which the document was cited. Percentages specified hereinbelow are by weight unless otherwise stated. Average values specified hereinbelow are number averages unless otherwise stated. Where properties of a material are referred to hereinbelow, for example viscosities or the like, these are properties of the material at 25° C. unless otherwise stated. When chemical (empirical) formulae are used in the present invention, the reported indices may be either absolute numbers or averages. Indices relating to polymeric compounds are preferably average values.

It is a feature of the composition according to the invention that the composition comprises OH-functional polybutadiene and at least one solvent. The composition may additionally comprise one or more auxiliary or added substances distinct from OH-functional polybutadiene and solvent.

It is preferable when as OH-functional polybutadiene the composition according to the invention comprises OH-functional polybutadiene having an OH number of 20 to 75, preferably 30 to 65, particularly preferably of 40 to 60 and very particularly preferably of 44 to 55. Determination of the OH number is effected in accordance with protocol DGF C-V 17a (German Society for Fat Science e.V.) as follows:

The OH number/hydroxyl number (OHN) specifies the number of milligrams of potassium hydroxide required to neutralize the acetic acid consumed in the acetylation of one gram of OH-functional polybutadiene. Hydroxyl groups are acetylated by acetic anhydride in the presence of pyridine. This affords one molecule of acetic acid per hydroxyl group while the subsequent hydrolysis of the acetic anhydride yields two molecules of acetic acid. 4-(dimethylamino)pyridine accelerates the acetylation. A water content of the product should not exceed 2 wt %. Faults: primary and secondary amines are also captured.

Materials and Reagents
   60° C. water bath
   250 ml flask with screwtop closure
   0.001 g analytical balance
   analytical grade pyridine
   analytical grade acetic anhydride
   synthesis grade 4-(dimethylamino)pyridine
   analytical grade phenolphthalein
   acetylation mixture: 125 g of acetic anhydride are made up to the mark with pyridine in a 1000 ml volumetric flask.
   catalyst solution: 5% m/V 4-(dimethylamino)pyridine in pyridine
   0.5 N aqueous sodium hydroxide solution
   1% ethanolic phenolphthalein Procedure: A suitable sample quantity is weighed into a 250 ml Erlenmeyer flask with screw closure and admixed with 10.0 ml of acetylation mixture and 0.4 ml of catalyst solution. The flask is closed and heated for 10 minutes at 60° C. in the water bath. 50 ml of distilled water are added and the mixture is titrated to the endpoint against phenolphthalein with 0.5 N aqueous sodium hydroxide solution. A blank test is conducted under the same conditions but without sample.

Evaluation is effected as follows:

$$\frac{(b-a) \times 28.05}{E} = \text{hydroxyl number (OHN) [mg KOH/g]}$$

b=consumption of 0.5 N NaOH in blank test (ml)
a=consumption of 0.5 N NaOH in main test (ml)
E=sample weight (g)

The OH number requires correction via acid number/alkalinity. The acid number needs to be added and the alkalinity subtracted.

The consumption in the main test must be below 25% of the blank test to ensure sufficient acetylation.

Determination of acid number may be effected for example in accordance with
DGF C-V 2,
Ph.Eur. 2.5.1,
ISO 3682,
ASTM D 974 or
DIN EN ISO 2114.

Determination of acid number is preferably effected as described hereinbelow:

1. Terms/Definitions
   Acid number (AN) indicates the mg of KOH required to neutralize the free acids present in 1 g of product.
2. Principle and Field of Application
   The sample is dissolved in a suitable solvent and the acids present are titrated with aqueous potassium hydroxide solution. Since acid number is completely unspecific it does not allow for distinguishing between mineral acids, free and bound fatty acids and other organic acids. It therefore also captures any mineral acids present which can be specifically determined as per DGF C-III 14.
3. Faults
   none specified
4. Materials and Reagents
   Solvent: 1:1 (v/v) ethanol/toluene mixture (neutralized against phenolphthalein)
   0.5 N aqueous potassium hydroxide solution in ethanol (about 80 vol %)
   Phenolphthalein solution, 1% in ethanol
   300 ml Erlenmeyer flask
   Suitable titration instruments, for example Metrohm Dosimat 725 or similar
   Burettes
   Magnetic stirrer bar (4 cm)
   Hotplate with stirrer (e.g. IKA)
   Analytical balance
5. Procedure
   8 g (+/−0.01) of the sample to be investigated is weighed accurately into the Erlenmeyer flask. About 100 ml of the neutralized solvent and a magnetic stirrer bar are added. The sample is then heated to boiling with "vigorous" stirring. The product does not dissolve completely>>>a dispersion is formed (the pellet structure needs to be dissolved)!

After addition of phenolphthalein solution the mixture is titrated "slowly" against aqueous potassium hydroxide solution with constant stirring with a magnetic stirrer bar until a permanent colour change (stable for at least 60 seconds) is observed.

6. Evaluation $$\text{Acid number [mg KOH/g]} = \frac{V \times 56.1 \times N}{E}$$

$$\text{Free fatty acid [\%]} = \frac{V \times MG \times N}{10 \times E}$$

V=titrant consumption (ml)
N=titrant normality
E=sample weight (g)
MG=fatty acid molar weight Determination of alkalinity/alkali content is preferably effected as described hereinbelow:

1. Principle and Field of Application
   Alkalinity and alkali content is determined by titration with standard acid
2. Faults
   none specified
3. Materials and Reagents
   0.001 g analytical balance
   300 ml Erlenmeyer flask
   Ethanol
   Dist. water
   0.1 N hydrochloric acid
   Phenolphthalein
   Phenolphthalein solution, 1% in ethanol 4. Procedure A suitable sample weight is weighed into an Erlenmeyer flask; for alkalinities dissolution is effected in about 100 ml of ethanol and for alkali salts and solutions thereof dissolution is effected in water. The solution is titrated with hydrochloric acid against phenolphthalein until a colour change from pink to colourless is observed.

5. Evaluation $$\frac{V \times 56.1 \times 0.1 \times f}{E} = \text{alkalinity [mg KOH/g]}$$

$$\frac{V \times MW \times 0.1 \times f \times 100}{1000 \times E} = \text{alkali content [\%]}$$

V=titrant consumption (ml)
E=sample weight (g)
f=titrant factor
MW=molar weight

It is preferable when as OH-functional polybutadiene the composition according to the invention comprises compounds of formula (I),

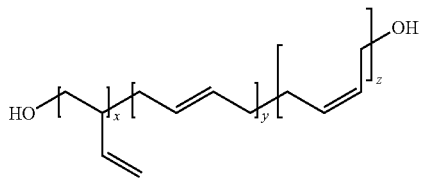

wherein the units having the index x are present in an average molar fraction based on the sum of the fractions having the indices x, y and z of 17% to 27%, the units having the index y are present in an average molar fraction based on the sum of the fractions having the indices x, y and z of 53% to 63% and the units having the index z are present in an average molar fraction based on the sum of the fractions having the indices x, y and z of 15% to 25%. It is particularly preferable when as OH-functional polybutadiene the composition according to the invention comprises compounds of formula (I) having an OH number of 20 to 75, preferably 30 to 65, particularly preferably of 40 to 60 and very particularly preferably of 44 to 55.

It can be advantageous when the OH-functional polybutadiene present in the composition has a weight-average molar mass of greater than 200 g/mol, preferably greater than 1000 g/mol and particularly preferably of 2000 to 6000 g/mol. The weight-average molar mass is determined as per DIN 55627-1 (GPC with styrene standard).

It is very particularly preferable when as OH-functional polybutadiene the composition according to the invention comprises compounds of formula (I) having an OH number of 20 to 75, preferably 30 to 65, particularly preferably of 40 to 60 and very particularly preferably of 44 to 55 and a weight-average molar mass of greater than 200 g/mol, preferably greater than 1000 g/mol and particularly preferably of 3000 to 3500 g/mol.

Suitable OH-functional polybutadiene may for example be produced as described in EP 2492292. However, suitable OH-functional polybutadiene may also be obtained from Evonik Industries AG under the trade name Polyvest EP HT.

Based on the overall constitution of the composition the compositions according to the invention comprise
A) 0.1 to 55 wt % of OH-functional polybutadiene,
B) 0.0 to 30 wt % of at least one release-active agent distinct from A and selected from the group of soaps, oils, waxes and silicones,
C) 0.0 to 10 wt % of emulsifiers,
D) 0.0 to 5 wt % of catalysts,
E) 0.0 to 5 wt % of foam stabilizers,
F) 0.0 to 5 wt % of viscosity modifiers,
G) 0.0 to 2 wt % of additives, preferably selected from the group comprising cell openers, preservatives, bactericides, fungicides and antioxidants and
H) solvent ad 100 wt %.

Based on the overall constitution of the composition the compositions according to the invention by preference comprise
A) 0.5 to 40 wt % of OH-functional polybutadiene,
B) 0.0 to 30 wt % of at least one release-active agent distinct from A and selected from the group of soaps, oils, waxes and silicones,
C) 0.1 to 10 wt % of emulsifiers,
D) 0.1 to 5 wt % of catalysts,
E) 0.0 to 5 wt % of foam stabilizers,
F) 0.0 to 5 wt % of viscosity modifiers,
G) 0.0 to 2 wt % of additives, preferably selected from the group comprising cell openers, preservatives, bactericides, fungicides and antioxidants and
H) solvent ad 100 wt %.

Based on the overall constitution of the composition the compositions according to the invention preferably comprise
A) 0.5 to 40 wt % of OH-functional polybutadiene,
B) 0.0 to 30 wt % of at least one release-active agent distinct from A and selected from the group of soaps, oils, waxes and silicones,
C) 0.1 to 10 wt % of emulsifiers,
D) 0.1 to 5 wt % of catalysts,
E) 0.1 to 5 wt % of foam stabilizers,
F) 0.0 to 5 wt % of viscosity modifiers,
G) 0.1 to 2 wt % of additives, preferably selected from the group comprising cell openers, preservatives, bactericides, fungicides and antioxidants and
H) solvent ad 100 wt %.

Based on the overall constitution of the composition the compositions according to the invention particularly preferably comprise
A) 0.5 to 40 wt % of OH-functional polybutadiene,
B) 0.0 to 1 wt % of at least one release-active agent distinct from A and selected from the group of soaps, oils, waxes and silicones,
C) 0.1 to 10 wt % of emulsifiers,
D) 0.1 to 5 wt % of catalysts,
E) 0.1 to 5 wt % of foam stabilizers,
F) 0.1 to 5 wt % of viscosity modifiers,
G) 0.1 to 2 wt % of additives, preferably selected from the group comprising cell openers, preservatives, bactericides, fungicides and antioxidants and
H) solvent ad 100 wt %.

As solvent the compositions according to the invention may comprise water and/or an organic solvent. It is preferable when the compositions according to the invention comprise water or an organic solvent.

In a preferred embodiment the solvent in the compositions according to the invention is water. In this embodiment it is particularly preferable when the composition is free from organic solvents, in particular the organic solvents defined hereinbelow.

In a further preferred embodiment of the present invention the solvent is an organic solvent. In this embodiment it is preferable when the composition has a content of water of less than 5 wt %, preferably less than 1 wt % and particularly preferably less than 0.1 wt % based on the composition.

When the solvent is an organic solvent it is preferably selected from organic solvents, preferably hydrocarbons, having a boiling point of 25° C. to 280° C., preferably 80° C. to 200° C. It is preferable when the organic solvents, preferably hydrocarbons, additionally have a flash point of >22° C., particularly preferably of >55° C.

As hydrocarbons the composition according to the invention preferably comprises highly refined mineral oil which may be composed for example of naphthenic, aromatic and/or paraffinic hydrocarbons. The hydrocarbon employed preferably has a kinematic viscosity at 40° C. as per DIN 51 562 T.1 between 10 and 150 mm2/s, preferably of 20 to 100 mm2/s. Suitable hydrocarbons are commercially available for example under the trade names Gravex®, Deutsche Shell AG, and Pionier®, Hansen & Rosenthal KG.

Examples of particularly suitable organic solvent are naphtha 100/140, Shellsol® D 40 from Deutsche Shell AG, Exxsol® D 40 from Exxon, isoparaffins such as for instance mixtures of isoundecane and isododecane (Isopar® H) from Exxon.

As release-active agent B) distinct from A) the composition according to the invention may contain for example the following substances: waxes, i.e. liquid, solid, natural or synthetic waxes, including in oxidized and/or partly saponified form, esters of carboxylic acids with alcohols or fatty alcohols, alkali metal or alkaline earth metal salts of fatty acids, optionally but not preferably with concomitant use of unsaturated oligomeric and/or polymeric hydrocarbons, silicones, such as polydimethylsiloxanes, optionally substituted with aliphatic or aromatic hydrocarbon radicals. Preferred release-active agents B) distinct from A) are in particular polybutadienes which are not OH-functional. Such polybutadienes are obtainable for example from Evonik Industries AG under the trade name Polyvest 130. Particularly preferred compositions according to the invention are those comprising one or more component(s) B). It is preferable when the fraction of components B) based on the overall constitution of the composition is 0.1 to 30 wt %, preferably 5 to 25 wt %.

As emulsifiers C) the compositions according to the invention may contain for example anionic emulsifiers, for example alkyl ether carboxylates, alkyl sulphates, fatty alcohol ethoxylate ether sulphates, alpha-olefinsulphonates, alkyl phosphates, alkylpolyether phosphates, alkyl sulphosuccinates; nonionic emulsifiers, for example ethoxylated fatty alcohols, ethoxylated oxo alcohols and other alcohol ethers, fatty amines, for example dimethylalkylamines, fatty acid alkanolamides, fatty acid esters with alcohols, for example glycerol esters or polyglycerol esters or sorbitol esters; cationic emulsifiers, for example acidified alkyldimethylamines or quaternary nitrogen compounds or zwitterionic surfactants or the silicone-containing compounds, for example polyether siloxanes. The sum of the emulsifiers in the composition according to the invention is by preference 0.1 to 10 wt %, preferably 0.5 to 6 wt %, based on the composition according to the invention.

As catalysts D) the composition according to the invention may contain any known polyurethane-reaction-catalyzing catalysts, for example Lewis acids, such as organotin or organobismuth compounds or salts, or Lewis bases, such as tertiary amines. It is preferable when a bismuth-comprising catalyst, particularly preferably Bi(III)octoate, Bi(III) isononate or Bi(III)neodecanoate, is used as catalyst D) in the compositions according to the invention.

As foam stabilizers E) according to the invention the composition according to the invention may contain the stabilizers known in the prior art. Preferred foam stabilizers are for example polysiloxane-polyether copolymers, talc, thickeners or silica. The sum of the foam stabilizers in the composition according to the invention is by preference 0.1 to 5 wt %, preferably 2 to 2.5 wt %, based on the composition according to the invention.

As viscosity modifiers F) the composition according to the invention may contain the viscosity modifiers known in the prior art. As viscosity modifiers the composition according to the invention preferably comprises for example polyacrylic acid derivatives known as carbomers or other polyelectrolyte thickeners, such as water-soluble cellulose derivatives or else xanthan gum.

As additives G) the compositions according to the invention may contain the additives known in the prior art, for example the biocide Acticide MBS from Thor or cell openers known from the prior art.

The composition according to the invention may be used as a release agent in the production of moulded polyurethane articles, in particular foamed polyurethane articles. The composition according to the invention may be employed as an internal release agent or an external release agent. The composition according to the invention is preferably employed as an external release agent. The term internal release agent is to be understood as meaning release agents added prior to the moulding process to the reaction mixture from which the moulded article is produced. The term external release agent is to be understood as meaning release agents applied to the moulding apparatus.

It is preferable when moulded article production involves bringing the mould to the desired mould temperature of 45° C. to 80° C., preferably 50° C. to 75° C., spray-coating said mould with the composition according to the invention as release agent, waiting for a certain time—about 0.5 to 2.5 minutes depending on the proportion of water—until the largest amount of water has evaporated, and then pumping in the reactive polyurethane system composed of polyols, polyisocyanates and optionally further additives such as catalysts, foam stabilizers and blowing agents. The mould is closed and once the curing time has elapsed is opened and the moulding is demoulded.

The composition according to the invention may also be employed as an antisquawk agent in the processing of moulded polyurethane articles, in particular foamed polyurethane articles. This involves applying the composition after demoulding of the moulded polyurethane article to the surfaces of the moulded polyurethane article that come into contact with other materials, in particular metallic materials. Application may be effected for example by spray-application or brush-application.

The present invention is more particularly elucidated in the examples which follow without any intention to restrict the invention to the embodiments described in the examples.

EXAMPLES

Substances Employed:
  Polyvest 130=polybutadiene from Evonik Industries AG
  Polyvest EP HT=OH-functional polybutadiene from Evonik Industries AG
  Lithene Ultra N4-9000=polymer from Synthomer plc
  Genamin SH 100D=1-stearylamine from TER HELL & CO. GMBH
  WACKER L 051 SILICONE OIL=polysiloxane from Wacker Chemie AG Niax SC 240=polysiloxane from Momentive
60% acetic acid from BCD Chemie
demineralized water from Reher+Ramsden
BNT cat 422=dibutyltin dilaurate from BNT Chemicals
Genamin 16R 302D=N,N-dimethylhexadecylamine from TER HELL & CO. GMBH
Acticide MBS=mixture of 2-methyl-2H-isothiazol-3-one and 1,2-benzisothiazol-3(2H)-one from Thor Specialties, Inc.

Release Agent 1 (Comparative Example)

345 g of Polyvest 130, 85 g of Lithene Ultra N4-9000 and 40 g of Genamin SH 100D were initially charged into a glass beaker and heated with stirring to 80° C.; 6 g of acetic acid were then added and the mixture was stirred for a further 5 minutes. 501.7 g of water were then added slowly. Finally, 4.5 g of Wacker silicone L051, 2.8 g of BNT cat 422, 10 g of Genamin 16R 302D and 5 g of Niax SC 240 were added with stirring.

Release Agent 2 (Inventive)

430 g of Polyvest EP HT and 40 g of Genamin SH 100D were initially charged into a glass beaker and heated with stirring to 80° C.; 6 g of acetic acid were then added and the mixture was stirred for a further 5 minutes. 501.7 g of water were then added slowly. Finally, 4.5 g of Wacker silicone L051, 2.8 g of BNT cat 422, 10 g of Genamin 16R 302D and 5 g of Niax SC 240 were added with stirring.

Release Agent 3 (Inventive)

215 g of Polyvest EP HT, 172.5 g of Polyvest 130, 42.5 g of Lithene Ultra N4-9000 and 40 g of Genamin SH 100D were initially charged into a glass beaker and heated with stirring to 80° C.; 6 g of acetic acid were then added and the mixture was stirred for a further 5 minutes. 501.7 g of water were then added slowly. Finally, 4.5 g of Wacker silicone L051, 2.8 g of BNT cat 422, 10 g of Genamin 16R 302D and 5 g of Niax SC 240 were added with stirring.

Release Agent Tests:

The release agents diluted in a volume ratio of 1:4 (release agent:water) were sprayed into a box mould by means of a Pilot Mini spray gun from Walther Pilot having a 0.5 mm nozzle in realistic usage amounts of 20 g/m² and an expandable polyurethane system composed of 100 parts of Desmophen® PU 21IK01, 3.5 parts of water, 0.4 parts of Tegoamin® TA 33, 0.25 parts of Tegoamin® AS-1, 0.7 parts of diethanolamine, 0.5 parts of Tegostab® EP-K-38, 0.2 parts of acetic acid (60% in water), 63.5 parts of Suprasec® 2412 was expanded in this box mould at 55° C.

After curing (10 minutes) the foam pieces were removed from the box mould and the residues on the foam pieces (cushion residue) and in the box mould (mould residue) were subjected to haptic evaluation. The results of these release agent tests are reported in Table 1.

TABLE 1

Release agent test results:

| Release agent | Cushion residue | Mould residue |
|---|---|---|
| 1 | severely oily and severely sticky | solid transparent film difficult to clean |
| 2 | dry | dry |
| 3 | slightly oily | slightly oily |

As is apparent from Table 1, use of the inventive release agents (2 and 3) results in a markedly reduced oiliness than when release agent 1 is used.

The invention claimed is:

1. An external mold release agent that comprises
A) from 0.5 to 40 wt % of OH-functional polybutadiene, wherein the OH-functional polybutadiene comprises compounds of formula (I),

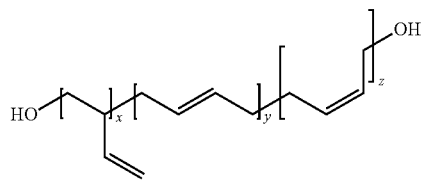

wherein the units having the index x are present in an average molar fraction based on the sum of the fractions having the indices x, y and z of 17% to 27%, the units having the index y are present in an average molar fraction based on the sum of the fractions having the indices x, y and z of 53% to 63% and the units having the index z are present in an average molar fraction based on the sum of the fractions having the indices x, y and z of 15% to 25% and has an OH number of 20 to 75,
B) from 0.0 to 30 wt % of at least one release-active agent distinct from A and wherein the at least one release-active agent is selected from the group consisting of soaps, oils, waxes or silicones,
C) from 0.1 to 10 wt % of emulsifiers,
D) from 0.1 to 5 wt % of catalysts,
E) from 0.1 to 5 wt % of foam stabilizers,
F) from 0.0 to 5 wt % of viscosity modifiers,
G) from 0.0 to 2 wt % of additives, wherein the additives are selected from the group consisting of cell openers, preservatives, bactericides, fungicides or antioxidants, and
H) solvent ad 100 wt %.

2. The external mold release agent according to claim 1, wherein as OH-functional polybutadiene the mold release agent comprises OH-functional polybutadiene having an OH number of 30 to 65.

3. The external mold release agent according to claim 1, wherein the OH-functional polybutadiene has an OH number of 40 to 60.

4. The external mold release agent according to claim 1, wherein the external mold release agent further comprises
F) from 0.1 to 5 wt % of viscosity modifiers
and the mold release agent has dry mold residue.

5. The external mold release agent according to claim 1, wherein the external mold release agent further comprises
G) from 0.1 to 2 wt % of additives selected from the group comprising cell openers, preservatives, bactericides, fungicides or antioxidants.

6. The external mold release agent according to claim 3, wherein the external mold release agent further comprises
F) 0.1 to 5 wt % of viscosity modifiers,
G) 0.1 to 2 wt % of additives, selected from the group consisting of cell openers, preservatives, bactericides, fungicides or antioxidants.

7. The external mold release agent according to claim 1, wherein the solvent is water.

8. The external mold release agent according to claim 1, wherein the solvent is selected from hydrocarbons having a boiling point of 25° C. to 280° C., and flash points greater than 22° C.

9. The external mold release agent according to claim 1, wherein the OH-functional polybutadiene has a weight-average molar mass of from 3000 to 3500 g/mol.

10. The external mold release agent according to claim 1, wherein the catalyst D) is a bismuth-comprising catalyst.

11. A molded polyurethane article comprising the external mold release agent according to claim 1.

12. The external mold release agent according to claim 1, wherein the solvent is selected from hydrocarbons having a boiling point of from 80° C. to 200° C. and a flash points of greater than 55° C.

13. The external mold release agent according to claim 5, wherein the OH-functional polybutadiene has an OH number of 30 to 65.

14. The external mold release agent according to claim 6, wherein the OH-functional polybutadiene has an OH number of 30 to 65.

15. The external mold release agent according to claim 5, wherein the OH-functional polybutadiene has an OH number of 40 to 60.

16. The external mold release agent according to claim 1, wherein the OH-functional polybutadiene has an OH number of 40 to 60.

17. The external mold release agent according to claim 5, wherein the OH-functional polybutadiene has an OH number of 44 to 55.

18. The external mold release agent according to claim 1, wherein the OH-functional polybutadiene has an OH number of 44 to 55.

19. The external mold release agent according to claim 5, wherein the OH-functional polybutadiene of formula (I) has a weight-average molar mass of from 3000 to 3500 g/mol.

* * * * *